(12) United States Patent
Galbraith et al.

(10) Patent No.: US 7,599,998 B2
(45) Date of Patent: Oct. 6, 2009

(54) MESSAGE HANDLING COMMUNICATION BETWEEN A SOURCE PROCESSOR CORE AND DESTINATION PROCESSOR CORES

(75) Inventors: Mark James Galbraith, Burwell (GB); Harry Samuel Thomas Fearnhamm, Cambridge (GB); Nicholas Esca Smith, Bottisham (GB); Bruce James Mathewson, Papworth Everard (GB)

(73) Assignee: ARM Limited, Cambridge (GB)

( * ) Notice: Subject to any disclaimer, the term of this patent is extended or adjusted under 35 U.S.C. 154(b) by 965 days.

(21) Appl. No.: 10/885,240

(22) Filed: Jul. 7, 2004

(65) Prior Publication Data

US 2005/0138249 A1 Jun. 23, 2005

(30) Foreign Application Priority Data

Dec. 18, 2003 (GB) ................... 0329352.9

(51) Int. Cl.
*G06F 15/167* (2006.01)
*G06F 15/76* (2006.01)

(52) U.S. Cl. ........................................ 709/213; 712/11

(58) Field of Classification Search ................. 709/213; 712/11
See application file for complete search history.

(56) References Cited

U.S. PATENT DOCUMENTS

| | | | |
|---|---|---|---|
| 4,818,984 A | | 4/1989 | Chang et al. |
| 6,105,071 A | * | 8/2000 | Desnoyers et al. .......... 709/237 |
| 6,425,002 B1 | * | 7/2002 | Zurcher et al. .............. 709/223 |
| 6,636,524 B1 | * | 10/2003 | Chen et al. ................... 370/418 |
| 6,754,744 B2 | * | 6/2004 | Kim et al. ...................... 710/56 |
| 6,799,317 B1 | * | 9/2004 | Heywood et al. ........... 719/313 |
| 7,181,482 B2 | * | 2/2007 | Jain et al. .................... 707/206 |
| 7,346,064 B2 | * | 3/2008 | Wadia et al. ................ 370/401 |

FOREIGN PATENT DOCUMENTS

| | | |
|---|---|---|
| EP | 0 511 731 A3 | 11/1992 |
| JP | 63305450 | 12/1988 |
| JP | 2000105753 | 4/2000 |

\* cited by examiner

*Primary Examiner*—Eddie P Chan
*Assistant Examiner*—Jacob Petranek
(74) *Attorney, Agent, or Firm*—Nixon & Vanderhye P.C.

(57) ABSTRACT

A data processing apparatus comprises at least one source processor core, at least two destination processor cores, a message handler and a bus arrangement providing a data communication path between the source core, the destination cores and the message handler. The message handler has plurality of message-handling modules. At least one of the message-handling modules has a message receipt indicator that is modifiable by each of the destination processor cores to indicate that a message has been received at its destination. This message-handling module also has a transmission completion detector operable to detect, in dependence upon a message receipt indicator value that a message has been received by all of the at least two destination processor cores and to initiate transmission of an acknowledgement signal to the source processor core.

54 Claims, 10 Drawing Sheets

MESSAGE HANDLING COMMUNICATION BETWEEN A SOURCE PROCESSOR CORE AND DESTINATION PROCESSOR CORES

TECHNICAL FIELD

The invention relates to data processing systems. More particularly, the invention relates to communication of message data in a data processing system.

BACKGROUND

Many modern data processing systems employ more than one processor core to run program applications. Such multi-core systems require mechanisms by which processor cores can communicate data with each other and determine when data sent from a source processor core to one or more destination processor cores has been received at its intended destination(s).

It is known in dual-core data processing systems for a destination processor core to transmit an acknowledgement signal on receipt of message data from a source processor core, the acknowledgement signal being transmitted directly from source core to destination core across a communication bus.

However, this message acknowledgement mechanism presents a problem in the case of a message that is directed from a source core to two or more destination cores (i.e. a multi-cast message). For multi-cast messages, before the source processor core can determine a pending message communication to be complete, the message must have been received by each of the two or more destination cores. In such systems there is a problem whereby a destination core cannot guarantee that it is the final core to clear a message notification signal and to then send back an acknowledgement signal to the source processor core without resorting to locked transfers.

SUMMARY

According to a first aspect, the application sets forth a data processing apparatus comprising:

at least one source processor core and at least one destination processor core;

a message handler having a plurality of message-handling modules, each of said plurality of message-handling modules having memory allocated for storage of a message generated by a source processor core for transmission to at least two specified destination cores;

a bus arrangement providing a data communication path between said source core, said destination core and said message handler;

wherein at least one message storing module associated with a respective specified source processor core has:

a message receipt indicator being modifiable by each of said at least two specified destination processor cores to indicate through an indicator value that said message has been received at the corresponding specified destination processor core;

a transmission completion detector operable to detect, in dependence upon said indicator value, that said message has been received by all of said at least two specified destination cores; and message acknowledgement generation logic responsive to said transmission completion detector detecting that said message has been received by all of said at least two specified destination cores, to initiate transmission of an acknowledgement signal to said source processor core.

The inventors recognized that by provision of a message receipt indicator and transaction completion detector in a message storing module of the message handler, receipt of a multi-cast message by each of the at least two destination cores can be readily tracked and a single acknowledgement can thus be sent to the source processor core when it is determined by the message handler that all of the destination cores have received the message. This simplifies the control mechanisms that must be implemented in the destination cores since a given destination core need not have the capacity to check whether it was the last of the destination cores to receive the message and if so send an acknowledgement interrupt back to the source core. Furthermore, provision of a transmission completion detector in the message handler rather than in individual destination processor cores gives a more easily scalable system since it provides for collation of message receipt information is to be performed centrally in the message handler.

It will be appreciated that the message transmitted by the source processor core to the at least two specified destination processor cores could be an interrupt signal having no associated data payload. However according to one preferred arrangement the at least one message-handling module has memory allocated for storage of a message generated by the specified source processor core, the message being readable through the bus arrangement by one or more destination processor cores. Provision of a data payload capacity for the messages enables more sophisticated communication between the source core and the destination core. Since the memory for the message is located in the message-handling module itself there is a clear mapping between stored messages and their message-handling modules.

According to a further, different, preferred arrangement, the at least one message-handling module has an associated memory region for storage of a message generated by said specified source processor core. The associated memory region being a region in a memory that is shared between said at least one processor core and said at least one destination processor core. This allows messages having data payloads to be communicated by the message handler without the requirement to provide data registers in the message handler itself.

It will be appreciated that the source core could be a different processor core from either of the at least two specified destination cores. However, according to one preferred arrangement one of the at least two specified destination cores is also the source core. This arrangement enables communication of message data between two different processes that are running concurrently on the same processor core as well as to a further, different processor core.

The destination processor core could be alerted to the existence of a message in the message handler in a number of different ways, for example by periodically sending polling requests to the message handler to determine if a message has recently been written there. However, advantageously, the message handler comprises interrupt-generating circuitry operable to notify the destination processor core of the presence of a message in the repository by transmission of an interrupt to the destination processor core. This notification by interrupt generation has the result that the destination core is rapidly notified of the existence of a relevant message and can retrieve and process that message expeditiously. Furthermore, it obviates the need for frequent polling by each processor core thereby saving communication bandwidth on the bus.

In such arrangements, it is also advantageous to provide the destination processor core with an interrupt controller operable to process interrupts transmitted to the destination core by the message handler. This allows the destination processor core to handle and process received interrupt signals in an efficient manner.

It will be appreciated that each of the at least one destination processor cores could be notified of the existence of a message in the message handler via an interrupt generated by the message handler. However, according to a preferred arrangement, each message-handling module has a mask status register having a programmable value for enabling or disabling transmission of interrupts to the destination processor core. This enables a different message notification system, such as a polling mechanism, to be used by at least a subset of the message repositories. Thus, some processor cores can use a polling mechanism to poll for the existence of a message at an appropriate stage of processing operations rather than being subjected to interrupts at arbitrary times during execution of program applications.

Preferably, the mask status register has an associated mask set register used to set bits in the mask register and a mask clear register used to clear bits in the mask register. This enables individual bits in the mask status register to be set without using read-modify-write transfers.

Although each destination processor core could be sent information with regard to which message-handling module a relevant message is to be stored in along with an interrupt signal informing the destination core of the existence of the message, it is preferred that the mask status register has an associated masked interrupt status register operable to store a value indicating which message storing module triggered a currently asserted interrupt. This simplifies the generation of the message notification interrupt yet the destination core can, on notification of the existence of a relevant message, readily access information in the masked interrupt status register to determine which of the message-handling modules should be read to collect the message.

It will be appreciated that ownership of the at least one programmable message-handling module could be mediated in a number of different ways, but it is advantageous to provide the message-handling module with a source register operable to store a programmable value corresponding to said specified source processor core. The source register is easily readable by other processor cores and is simple to re-program. Furthermore, a core can request ownership of the message handler by attempting to write to the source register to gain ownership in one processor cycle and then reading back the source register on the next processor cycle to determine whether or not it successfully acquired ownership. Accordingly, there is no need to lock the source core read-write operations together.

Although the interrupt line used to notify the source core that the message has been received by all destination processor cores could be selected dynamically, it is preferred that the source register is operable to define an interrupt line to be asserted to the specified processor core for an acknowledgement interrupt. Thus when it is determined at the message handler that the last of the destination cores has received the message, the source register is read to establish on which interrupt line the acknowledgement should be sent.

In preferred arrangements the source register of the programmable message-handling module has a cleared mode and a programmed mode. In the cleared mode the programmed value held in the register is a clearing value and the source register is write-enabled. However, in the programmed mode the destination register is write-disabled for all values except the clearing value. This ensures that only a single core has control of the message-handling module at any one time.

It will be appreciated that specification of destination processor cores for which a message is intended could be implemented in a number of different ways, but it is advantageous to provide the at least one programmable message-handling module with a destination register operable to store a programmable value representative of the at least one destination processor cores.

Preferably, the destination register has an associated destination set register used to set bits in the mask register and a destination clear register used to clear bits in the mask register. This enables individual bits in the destination register to be set without using read-modify-write transfers.

In some preferred arrangements, the message receipt indicator of the message-handling module is the destination register. Since the destination register stores each message destination, when an interrupt to a destination core is cleared by the destination core, the corresponding entry in the destination register can be readily cleared indicating that the message has been received. Thus when all bits in the destination register have been cleared the source register may be informed that the multi-cast message communication has been completed. The destination register thus provides a convenient way of keeping track of which messages have been received.

It will be appreciated that a number of different messages could be sent to respective destination cores at different times and each message could be independently acknowledged. However, according to a particular preferred arrangement, one of the at least one source processor cores is operable to send a sequence of messages to a linked subset of said plurality of message-handling modules. Each message of the sequence has a respective specified destination processor core and each message-handling module in said linked subset of message-handling modules has a message receipt indicator, a transmission completion detector and message acknowledgement generation logic. Transmission of second and subsequent messages in said message sequence of said linked subset of message-handling modules is initiated when the message receipt indicator of the message-handling module corresponding to a preceding message in said message sequence indicates that said preceding message has been received at the respective specified destination core.

This linking of message-handling modules enables a source core to stack a plurality of messages in different message-handling modules in the message handler, the messages being sent only when previous messages have been acknowledged. These messages can be directed to any chosen destination processor core. This is particularly useful in cases where a core cannot start to deal with a subsequent message until a previous message has been processed, e.g. if the contents of individual messages are specially related in a processing sequence.

Although message notification interrupts to the destination processor core and message acknowledge interrupts to the message handler could be sent without keeping track of the current status of the interrupt, it is preferred that the at least one programmable message-handling module has a send register operable to store at least one interrupt status bit that determines whether an interrupt to said at least one destination processor core or to said source processor core is currently triggered. This allows the system to keep track of which message communications are still pending and to determine appropriate points at which ownership of message-handling modules can be safely transferred without loss of data.

It will be appreciated that the destination processor core could acknowledge receipt of the message by sending a return message directly to the source processor core or sending a return message via the message handler, but it is preferred that the destination processor core is operable to indicate receipt of the message by initiating modification of the send register value to clear the interrupt to the destination core. Thus, when there is more than one destination processor core, the message storage module can efficiently collate all of the received acknowledgements to determine whether the message communication has been received by all of the processor cores.

Although modification of the send register by the destination core could be monitored by the source processor core by polling to determine when the destination core has received the message, it is preferred that the modification of the send register initiates transmission of an acknowledge interrupt to the source processor core.

According to an alternative preferred arrangement the message receipt indicator of the at least one message-handling module is the send register. Since the destination processor core is operable to modify the send register value of the appropriate message-handling module to clear the interrupt that indicates the existence of a relevant message in the message handler, the modification of the send register value provides a direct indication of when a message has been received at the corresponding destination core. In the case of linked message-handling modules, the information from the send register of one module can be used to trigger message generation in the subsequent message-handling module in the linked subset.

It will be appreciated that the linking of subsets of message-handling modules could be implemented in a number of different ways. However, it is preferred that the at least one message-handling module has a mode register operable to store a value indicating if the associated message-handling module is linked to a consecutive message-handling module in the linked subset of message-handling modules. This means that the linkage of message-storage modules can be readily re-defined by changing the values in the mode register.

Conveniently, when the transmission completion detector detects that a particular message-handling module is a last message-handling module in the linked subset using the mode register value, it may initiate generation of an acknowledgement interrupt to said source core when the destination core for the message in said last message-handling module indicates receipt of said message. The mode register value of the last message-handling module is set to indicate that there is no subsequent module in the sequence hence the associated destination core it is known to be the last message recipient. Thus, the point at which an acknowledgement should be sent back to the source processor core can be readily determined.

It will be appreciated that an acknowledgement signal could be sent to the source processor core by each destination processor core associated with the linked subset of message-handling modules. However, it is preferred that all message-handling modules in said linked subset except the last message-handling module are configurable such that generation of an acknowledge interrupt to said source processor core is disabled. Thus the source processor core is only interrupted when the entire sequence of messages has been received at respective destination cores and there is no need for either the source core to keep track of the number of received acknowledgements.

It is preferred that the message-handling module associated with said last processor core is operable to automatically set the send register to initiate generation of an acknowledgement interrupt to said source processor core when the send register of said last message-handling module indicates that an interrupt should be sent to the source processor core. This means that no further intervention of a processor core is needed to effect the acknowledgement interrupt.

It will be appreciated that the message handler could have many different configurable parameters such that it is adaptable for use in different data processing systems. However, it is advantageous to provide a message handler that has: a configurable number of message storage modules; a configurable memory capacity for storage of the message; and a configurable number of interrupt signal paths available to the message handler. The configurability of the number of message storing modules means that the message handler is scalable to data processing systems having different numbers of cores and can adapt to the different message passing requirements of different program applications running on the same hardware. The configurability of the message storing capacity allows for messages of different maximum sizes to be communicated between processors. The configurability of the number of interrupt signals enables a given source processor core to communicate a given message to a specified number of destination processor cores substantially simultaneously.

Advantageously, the current values of the configuration parameters are stored in a configuration register in the message handler, thereby enabling message handler driver software to determine the current message handler configuration. Where there are multiple instances of message repositories in a given data processing system, the configuration register of each instance is read to determine how that particular instance should be used.

According to a second aspect, the application sets forth a method for communicating data between at least one source processor core and at least one destination processor core using a message handler having a plurality of message-handling modules and having a bus arrangement that provides a data communication path between said source core, said at least one destination core and said message handler, said method comprising the steps of:

transmitting a message from a specified source processor core to message-handling modules associated with respective ones of at least two specified destination processor cores;

modifying an indicator value of a message receipt indicator belonging to a message-handling module associated with either said source processor core or one of said specified destination processor cores to indicate that said message has been received at the corresponding specified destination processor core;

detecting using a transmission completion detector and in dependence upon said indicator value, that said message has been received by all of said at least two specified destination cores; and initiating transmission of an acknowledgement signal to said source processor core in response to said transmission completion detector detecting that said message has been received by all of said at least two specified destination cores.

Complementary aspects as defined in the appended claims include a computer program for controlling a source core in a data processing system and a computer program for controlling a destination core in a data processing system.

The above, and other objects, features and advantages will be apparent from the following detailed description of illustrative embodiments which is to be read in connection with the accompanying drawings.

DETAILED DESCRIPTION

Figure 1A:
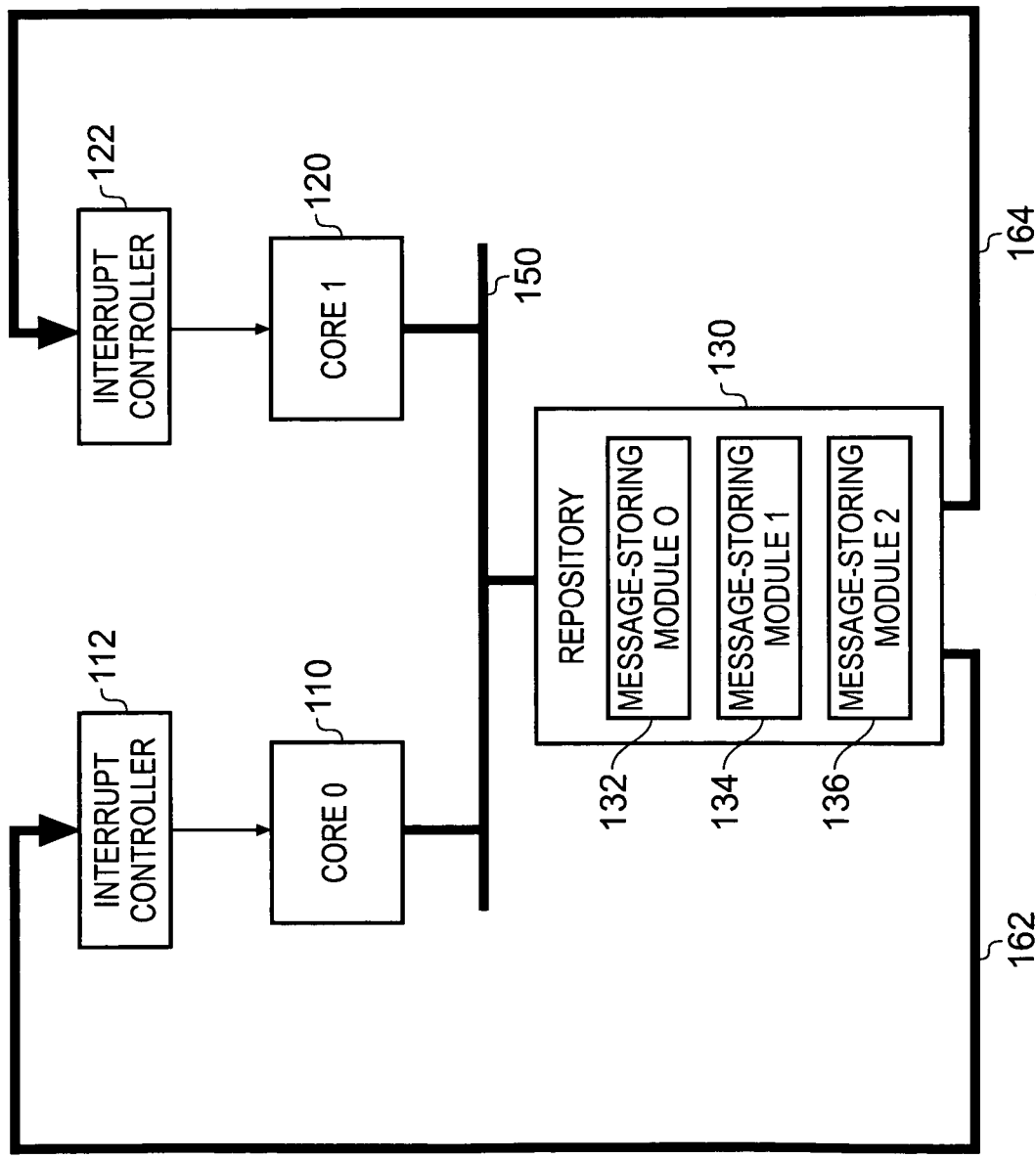
FIG. 1A schematically illustrates a data processing apparatus comprising two processor cores and a message handler.

FIG. 1 schematically illustrates a data processing apparatus comprising two processor cores and a message handler 130. The apparatus comprises: a first processor core 110 and associated interrupt controller 112; a second processor core 120 and associated interrupt controller 122; a message handler having three message-handling modules 132, 134, 136 and a common bus 150 that provides a data communication path between the processor cores 110, 120 and the message handler 130. The message handler 130 outputs interrupts along signal lines 162 and 164 to the first interrupt controller 112 and the second interrupt controller 122 respectively. Note that although in this bus arrangement a common bus 150 is used, in alternative bus arrangements separate buses may be provided to connect each processor core to the message handler 130.

Each message-handling module is capable of storing a predetermined amount of data. The message data will typically be written to the message-handling module by a source processor core and read by at least one destination processor core, the source core typically being different from the destination cores. However, messages from different processes on the same processor core can also be communicated via the message handler. The message handler 130 is programmably configurable such that each of the three message-handling modules 132, 134, 136 is either in a fixed mode in which it is dedicated to storing messages for a specified processor core regardless of whether or not a message communication is currently pending, or in a floating mode; in which the message-handling module can be claimed by either of the processor cores 110, 120 for write-access during periods when no message communication is pending. A master operating system of the two processor cores 110, 120 is configured with information specifying which of the message-handling modules is in floating mode and which is in fixed mode.

The message handler 130 generates interrupts under software control. These interrupts typically have data associated with them and can be directed to a plurality of different interrupt outputs. Each interrupt output directly corresponds to a bit in a source register, a destination register and a mask register in each message-handling module (see FIG. 3) and these registers control which interrupt lines are asserted and when messages are sent and acknowledged. One or more interrupt outputs 162, 164 can be connected to each interrupt controller 112, 122. As in the arrangement of FIG. 1A, generally an interrupt output from the message handler 130 is connected to each interrupt controller 112, 122 associated with a processor core, so that any core can send a message to any other core in the data processing system. However, in alternative arrangements more than one interrupt can be fed to the interrupt controller of a single processor core. This enables different types of message to be indicated on different interrupt lines fed into a given processor core.

Each interrupt output from the message handler 130 has an associated channel ID. The channel ID is a one-hot encoded (i.e. single bit set but all other bits zero) hexadecimal number that is used to program the source, destination and mask registers. When a destination core has received a message handler interrupt via an interrupt controller 112, 122, the destination core determines which message-handling module triggered the interrupt by reading a masked interrupt status register related to that interrupt line. For example if Core0 is mapped to channel ID 1, then the destination core reads a masked interrupt status register IPCMMIS0 to determine which message-handling modules should be read to retrieve messages. The masked interrupt status register is a 32-bit read-only register having a single bit mapped to each message-handling module.

Figure 1B:
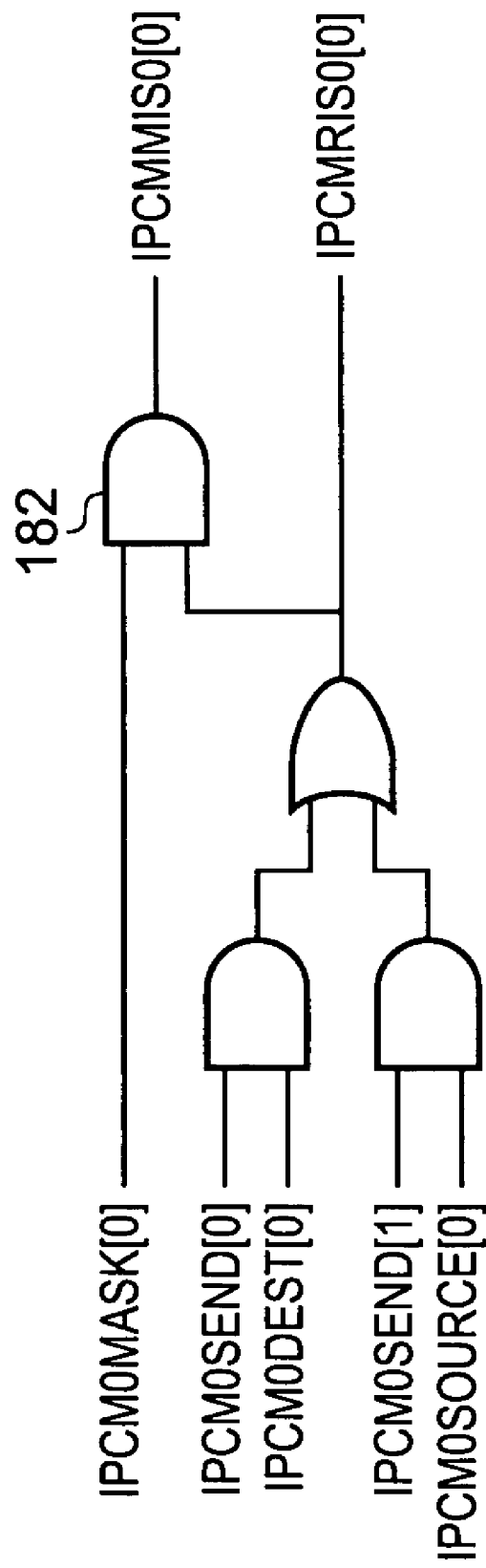
FIG. 1B shows how message-handling module status is presented to a core through the use of two status registers.
Figure 3:
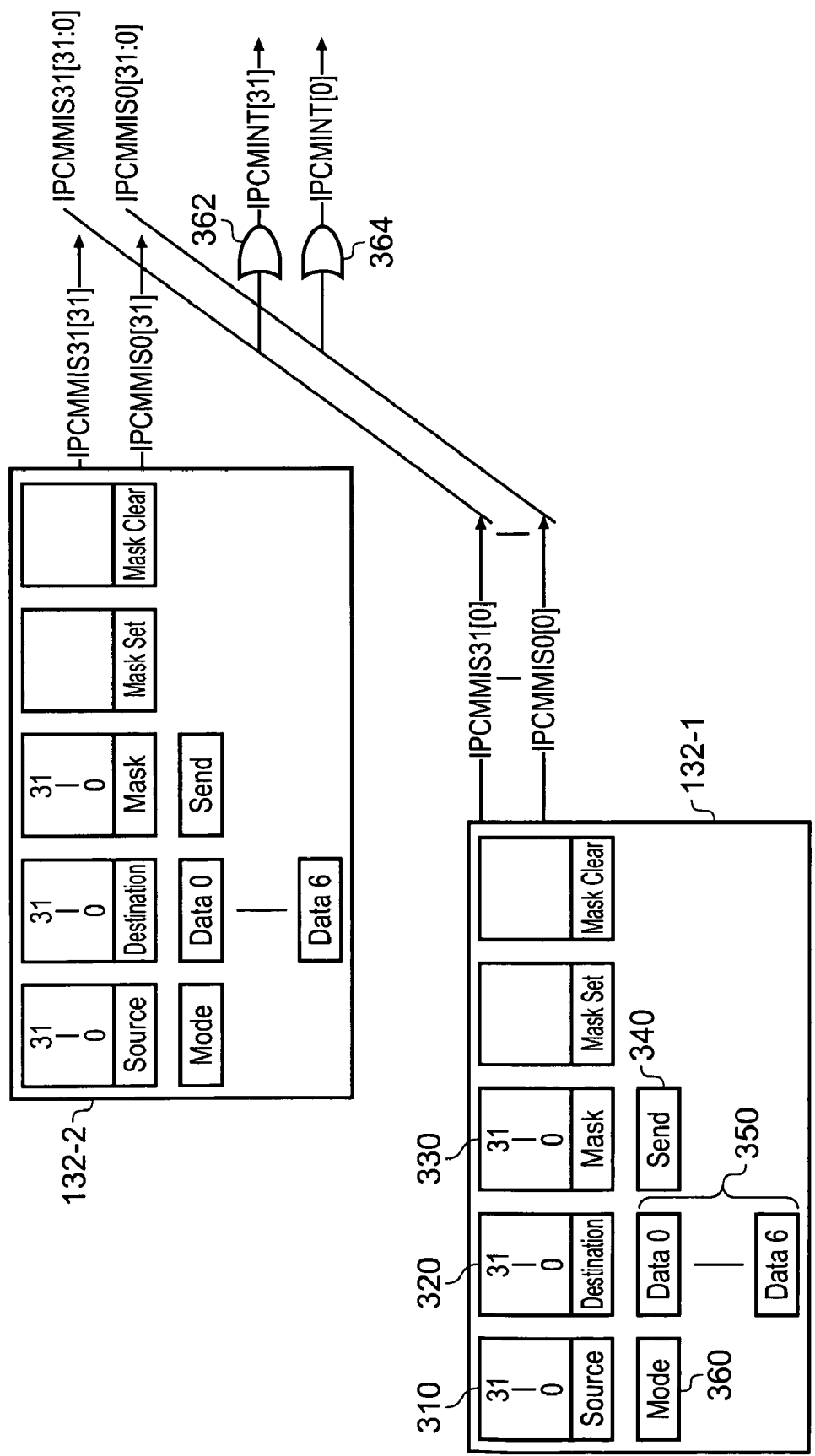
FIG. 3 schematically illustrates how message-handling module interrupt signals map to message handler interrupt outputs.

FIG. 1B shows how message-handling module 0 status is presented to core 0 through the use of two status registers denoted IPCMMIS0 and IPCMRIS0 and corresponding to a masked interrupt status register and raw (i.e. unmasked) interrupt status register respectively. The function of the mask register will be explained more fully below with reference to FIG. 3. In FIG. 1B the masked interrupt status registers identify which mailbox triggered the interrupt. This value is the logical AND 182 of the raw interrupt status with the mask status registers. All masked interrupt status register outputs are ORed together to form an IPCMINT[31:0] interrupt output bus as shown in FIG. 3.

In the arrangement of FIG. 1A, consider the communication of a message from the first processor core 110 to the second processor core 120 via the message handler 130. In this example the message handler is configured such that the first processor core has exclusive ownership of the first message-handling module 132. Accordingly, only the first processor core 132 has write access to module 132. The first processor core 110 generates a message and writes that message to message-handling module 132 specifying that the message destination is the second processor core 120. The message-storing repository generates an interrupt along signal line 164 that is received by the interrupt controller 122, which then notifies the second processor core 122 that a message destined for it has been stored in the message handler 130. The second processor core 120 determines from the masked interrupt status register entry that the first message-handling module 132 contains the relevant message and reads the message from this location in the message handler 130. The second processor core then sends an acknowledgement of receipt of the message back to the message handler 130 (rather than sending the acknowledgement directly to the first processor core 110). The first processor core 110 reads a register in the first message-handling module 130 to determine if the acknowledgement has been received. The first processor core 110 can write a new message to the first message handler 132 only if receipt of the preceding message has been acknowledged.

The message handler 130 can be configured such that the ownership mode of the three message-handling modules 132, 134, 136 is different for different program applications running on the data processing apparatus. For example, when program application A is running, the first and second message-handling modules 132, 134 may both be in fixed mode and dedicated to the first processor core 110 whilst the third message-handling module exclusively owned by the second processor core. However, when program application B is running, the message handler 130 may be configured such that the first message-handling module 132 is exclusively owned by the first processor core, the second message-handling module 134 is exclusively owned by the second processor core whereas the third message-handling module 136 is a floating module, ownership of which may be obtained by either the first or the second processor core 110, 120 during periods when no message communication is pending. The ability to adjust the mapping between processor cores and message-storing in this way provides allows the data processing system to accommodate the different message passing requirements of different applications in an efficient manner.

Figure 2:
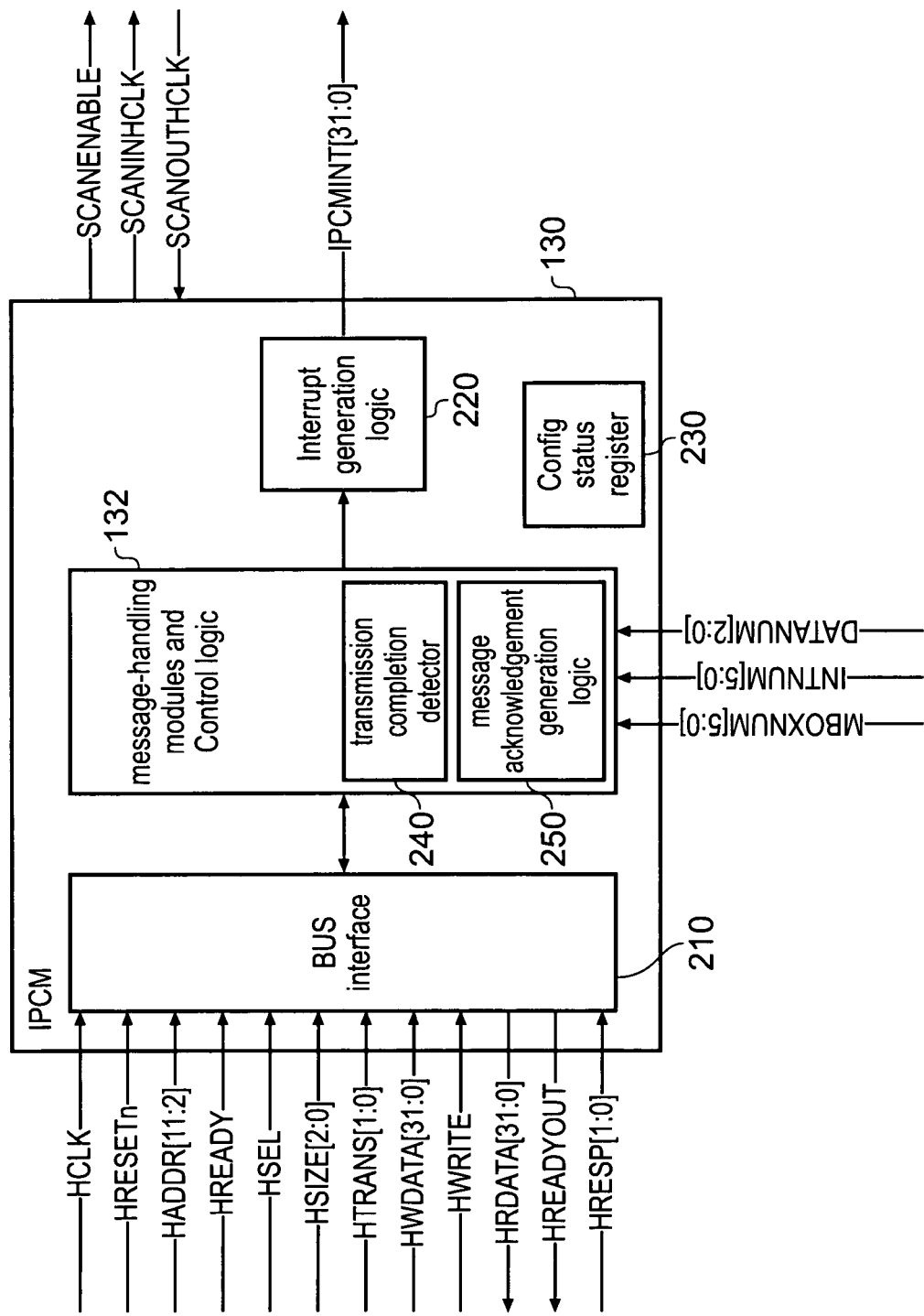
FIG. 2 schematically illustrates the functional components contained in the message handler of FIG. 1A.

If two or more application programs are running concurrently on the same data processing system then a change in configuration of the message handler may be initiated by a master operating system whenever a context switch between applications occurs. Occurrence of a context switch initiates storage of all register contents to memory. According to the present technique, the context switch may also trigger copying of the contents of the message-storing repositories to memory and clearance of all interrupts associated with the message passing mechanism FIG. 2 schematically illustrates the functional components of the message handler 130 of FIG. 1A. The message handler 130 comprises a bus interface module 210, a plurality of message-handling modules and associated control logic 132 and interrupt generation logic 220.

In this example arrangement there are thirty-two message-handling modules. Each of these thirty-two modules has control registers for storing control information and data registers for storage of messages. When a message is written to a data register of one of the message-handling modules, the interrupt generation logic 220 is triggered to send an interrupt to each specified destination core. The bus interface module 210 enables communication of data across the common bus 150 using the Advanced Microprocessor Bus Architecture (AMBA™) protocol developed by ARM Limited of Cambridge, England. Write requests from the source processor core and read requests from the destination processor core are serviced using this bus protocol.

FIG. 2 shows a series of bus signals input to and output by the bus interface module 210. Table 1 below lists AMBA Advanced High-Performance Bus (AHB) slave signals used by the bus interface module 210. Table 1 specifies, for each signal type, whether it is an input or output signal and gives a description of the information is communicated by the corresponding signal. Note that by convention all signals prefixed by H are AHB signals. In table 1 the message handler 130 is referred to as the IPCM (inter-processor communications module).

Input signals HCLK and HRESETn are AMBA AHB common signals. The signal HCLK is a clock input signal that is supplied to a clock controller in the message handler 130 and the signal HRESETn is a bus reset signal that is active when LOW. The signal IPCMINT[31:0] is a 32-bit signal (which is active when HIGH) that is output by the interrupt generation logic 220 of the message handler 130. It is an interrupt signal destined for the interrupt controller(s) of the specified destination processor core(s) for a given message. These interrupt signals are used to notify the destination processor core of the existence of a relevant message in the message-repository.

Input signals MBOXNUM[5:0], INTNUM[5:0] and DATANUM[2:0] are supplied to the unit 132 that comprises the message-handling modules and associated control logic. Each of these three inputs is a tie-off only signal. MBOXNUM[5:0] is an input configuration pin to define the number of active mailboxes. INTNUM[5:0] is an input configuration pin to define the number of active interrupts. DATANUM[2:0] is an input configuration pin to define the number of active data registers in each mailbox

TABLE 1

| Name | Type | Source/destination | Description |
| --- | --- | --- | --- |
| HADDR[11:2] | Input | Send or receive core AHB | System address bus |
| HREADY | Input | Send or receive core AHB | Transfer completed input. When HIGH, this signal indicates that a transfer has finished on the bus. |
| HSEL | Input | Send or receive core AHB | Slave select signal for IPCM control and status registers |
| HSIZE[2:0] | Input | Send or receive core AHB | Transfer size signal. This signal indicates the size of the current transfer, which can be byte (8-bit), halfword (16-bit), or word (32-bit). The IPCM only supports 32-bit transfers. |
| HTRANS[1:0] | Input | Send or receive core AHB | Indicates the type of the current transfer, which can be NONSEQUENTIAL, SEQUENTIAL, IDLE, or BUSY |
| HWDATA[31:0] | Input | Send or receive core AHB | Write data bus |
| HWRITE | Input | Send or receive core AHB | Transfer direction signal. When HIGH, this signal indicates a write and, when LOW, a read |
| HRDATA[31:0] | Output | Send or receive core AHB | Read data bus |
| HREADYOUT | Output | Send or receive core AHB | Transfer done output. When HIGH, this signal indicates that a transfer has finished on the bus. This signal can be driven LOW to extend a transfer. The IPCM is always zero wait state, therefore this signal is always driven HIGH. |
| HRESP[1:0] | Output | Send or receive core AHB | The transfer response provides additional information on the status of a transfer. The IPCM always provides an OKAY response. |

The interrupt generation logic 220 of FIG. 2 outputs up to thirty two interrupt signals IPCMINT[0:31], each of thirty-two channel IDs being mapped to an interrupt signal.

FIG. 3 schematically illustrates how message-handling module interrupt signals map to message handler interrupt outputs. As shown in FIG. 3, each message-handling module comprises a source register 310, a destination register 320, a mask register 330, a send register 340 and a plurality of data registers 350 in which a message data can be stored and a mode register 360.

In this arrangement the message handler comprises between one and thirty-two programmable message-storing repositories and up to seven 32-bit data registers to store each message. The arrangement further comprises between one and thirty-two read-only interrupt status registers, there being one interrupt status register per core. Some of the interrupts may be disabled via the mask register 330.

The message storing module 130 has three configurable parameters:
1. Number of interrupts (1 to 32)
2. Number of message-handling modules (1 to 32)
3. Number of data registers (0 to 7)

Appropriate setting of the above three parameters allows the message handler to be specifically configured to match the requirements of the data processing system thereby reducing the gate count of the circuitry as far as possible for the system concerned to enhance performance and efficiency. The values chosen for each of the above three configurable parameters are specified in a read-only configuration status register in the message handler. The read-only configuration status register is used by the message handler software driver to determine how to use the message handler for a given system.

The source register 310 is a 32-bit read/write register that is used to identify the source processor core that generated the message. The source register 310 is programmed with a channel ID value to identify an interrupt line on which the acknowledge interrupt signal should be sent. The channel ID can only be programmed into the register if the current register value is 0x00000000 (where the prefix 0x signifies a hexadecimal number) indicating a cleared mode. When the register has been programmed with a value other than the cleared value then it must first be cleared to 0x00000000 before it can be reprogrammed. This mechanism guarantees that only a single core has control of the message-storing repository at any one time.

To send a message, a source processor core must obtain ownership (i.e., write-access to) of a message-storing repository. This is done by the source core writing one of its channel IDs to the Source Register 310 and then reading the Source Register back to determine whether the write has been successful and ownership has been secured. The source register 310 should contain only a single programmed value, that is, a single channel ID. The message-storing repository software ensures that only a single encoded number is written to the source register 310 so that only one source processor core has write-access to the associated message-handling module. When the Source Register 310 is in the programmed state and contains a channel ID, it can only be cleared and not overwritten with a different channel ID. A message-handling module that is in floating mode is relinquished by a core when it is no longer required, by clearing the Source Register 310. Clearing the Source Register 310 also clears all of the other registers 320, 330, 340, 350 in the message-storing repository. This guarantees that a message-storing repository is always cleared when it is newly allocated.

The destination register 320 is a 32-bit register used to specify one or more message destination core in the data processing apparatus. The destination register 320 has separate set and clear write locations to enable individual bits in the destination register to be set without using read-modify-write transfers. A single bit can be set in the destination register by writing that bit to a destination set register. The destination set register is a 32-bit write only register whose function is to set bits in the message-handling module destination register. Setting a bit in the destination set register causes the hardware to OR that bit with the current value in the destination register 320. Similarly, a single bit can be cleared in the destination 320 register by writing that bit to a 32-bit write-only destination clear register. The source core defines which cores are to be the destination cores by programming the OR of all the Channel IDs into the destination register. If a core has more than one Channel ID, then only one is used per message. The Destination Register 320 can only be written to after the source register has been defined (by writing of a channel ID into it).

The mask register 330 is a 32-bit register having one bit per interrupt output. If the bit for a given processor is set to zero, then interrupts are disabled for that processor core, whereas if the bit is set to one the interrupt for that core is enabled. If interrupts are disabled in this manner, then the core polls the message handler 130 at frequent intervals to determine whether or not a relevant message has been deposited there. The mask register is cleared when the source register 310 is cleared. The mask register 330 uses separate 32 bit write-only set and clear registers for modification, similar to the destination register 320. The mask register 330 enables the interrupt outputs. To enable interrupts for a particular message-storing repository, a core writes the channel ID of the destination core to the mask set register. The interrupt for that message-storing repository can be masked out by writing the same Channel ID to the mask clear register. The mask register 330 locations can only be written to after the source register 310 has been defined.

The send register 340 is a 2-bit read/write register that is used to send a message to either source or destination cores. The send bits can only be written to once the source register has been defined. Setting of the zeroth bit of the send register generates an interrupt to the destination core(s) whereas setting the first bit generates an interrupt to the source core. A message is sent by setting bit 0 of the send register 340. This triggers the interrupt to the destination core. Clearing this bit clears the interrupt to the destination core. An acknowledge interrupt is sent to the source core by setting bit 1 of the send register 340. Clearing this bit clears the interrupt to the source core. Clearing bit 0 and setting bit 1 in the send register 340 can be performed in one write, although this is not mandatory. The Send Register 340 can only be written to after the source register 310 has been defined. The send register bit assignments are detailed in table 2 below.

TABLE 2

| Bit | Name | Function |
|---|---|---|
| [31:2] | Reserved | Reserved, read undefined, do not modify |
| [1:0] | Send | Send message:<br>00 = inactive<br>01 = send message to destination core(s)<br>10 = send message to source core<br>11 = invalid, unpredictable behavior |

The data registers 350 comprise a series of seven 32-bit read/write registers that are used to store the message data. The data registers can only be written to once the source register has been defined and are cleared when the source register is cleared.

The data registers 350 are typically written to before sending the message. The number of data registers per message-handling module is configured such that it is between zero and seven. In arrangements where there are no data registers in the message-handling module the message is stored in a predetermined region of shared memory. The shared memory being shared between source cores and destination cores of the data processing system.

The mode register 360 is a two-bit read write register. Bit 0 is set to enable an auto-acknowledge mode whereas bit 1 is set to enable an auto-link mode in the corresponding message-handling module. The mode registers can only be written to when ownership of the corresponding message-handling module has been asserted by the setting of a bit in the source register. The mode registers are cleared when the source register is cleared.

When the auto-acknowledge mode is enabled, an acknowledge interrupt is automatically sent back to the source processor core when the destination register, having a bit set for each destination processor core, is fully cleared. Each destination core clears the appropriate bit of the destination register to clear the message notification interrupt when it has received the corresponding message. The destination core achieves this by writing its channel ID value to the appropriate bit within the destination clear register. Thus, the auto-acknowledge interrupt indicates when all destination cores have received a message and have cleared their interrupts. The auto-acknowledge mode should always be set if there are two or more destination cores. The data associated with the auto-acknowledge is the same as that for the original message. Auto acknowledge mode can be used for between one and thirty-two receiving cores in the data processing system comprising thirty-two cores. Message-handling module 0 is linked to message-handling module 1 by setting the auto-link bit in the mode register of module 0. In auto-acknowledge mode the destination register serves as a message receipt indicator, which is modified by each destination processor core to clear the message notification interrupt. A transmission completion detector in the message-handling module monitors the bit settings of the destination register to determine when all of the messages have been received at their destinations and determines when transmission of an acknowledgement interrupt to the source processor core should be initiated.

For a single destination core, the acknowledgement interrupt may be manual (i.e. auto-acknowledge mode disabled). In this case, there is a possibility of updating the message for the acknowledge. For a manual interrupt, the acknowledge interrupt is generated when the destination core clears bit 0 of the send register to clear the message notification interrupt and sets bit 1 of the send register to (manually) initiate the acknowledgement interrupt.

When the auto-link mode is enabled, a linked subset of the message-handling modules is defined such that the messages stored in those message-handling modules are sent to their destinations sequentially, the next message in the sequence only being sent when a previous message has been received at its destination core. The source processor core is sent an acknowledgement only when the last message in the sequence has been received at its destination. If the auto-link mode is enabled by setting of bit 1 in the mode register, then when the destination core for the message stored in the corresponding message-handling module clears its message notification interrupt, the acknowledge interrupt to the source core is suppressed, and instead, clearing of the interrupt initiates sending of the next message in the sequence from the next message-handling module. Note that when auto-link is enabled and auto-acknowledgement is disabled (as will be described later), the destination core clears bit 0 and sets bit 1 of the send register in the usual way, but the acknowledge interrupt to the source core is masked out and send bit 0 is set in the next message-handling module. Accordingly, the last message-handling module in the linked subset does not have auto-link mode enabled so that the acknowledge interrupt is not suppressed when the last message has been received at its destination. For ease of implementation and testing of the system, it is convenient to have a fixed order of linking of the message-handling modules. According to a preferred arrangement, module 0 links to module 1, which can link to module 2 and so on up to message-handling module 31. The messages are programmed into the appropriate modules so that the desired sequence is followed.

In auto-link mode, a sending core can allocate multiple message-handling modules to itself, link them together by setting the auto link bits of all but the last module in the linked subset and pre-load messages in all of the modules of the subset. When the first message is sent, it not acknowledged until all the messages have been sent. There is no restriction on the destinations of these messages. Auto-link mode and auto-acknowledge mode can both be enabled for a messaging sequence.

When auto-link mode is disabled, the source core is interrupted if an acknowledgement interrupt is sent but this will have no effect on any other message-handling module.

In auto-link mode, the send registers of the message storing modules serve as message receipt indicators since the send registers are modified by the destination processor cores to indicate that the message has been received by clearing the message notification interrupt. The auto-link mode bit of the mode register of the message storing modules, together with the send registers serve as transaction completion detectors in the case of linked message-handling modules. The last of the message-handling modules in the linked subset is not set to auto-link mode so that when the last message of the sequence is received, transmission of an acknowledgement interrupt to the source processor core is initiated.

Each of the thirty-two message-storing repositories of FIG. 3 can generate up to 32 interrupts, one for each Channel ID. The number of interrupts defines the number of bits in the Source, Destination, and Mask Registers. For example, the message handler of which the message-handling modules of FIG. 3 are components has 32 interrupt outputs. Message-storing repository 0 generates bit 0 of the IPCMMIS0-31 buses, while Message-storing repository 31 generates bit 31 of the IPCMMIS0-31 buses. Multiple message-storing repositories are grouped together via OR logic gates 362, 364 as shown in FIG. 3 to form the 32-bit message handler interrupt bus, IPCMINT[31:0]. All the interrupt bits from each message-storing repository relating to a single Channel ID are grouped together to form the masked interrupt status buses, IPCMMIS0[31:0] to IPCMMIS31[31:0]. The bits within these buses are then ORed together via OR gates 362, 364 to form the message handler interrupt bus.

Figure 4:
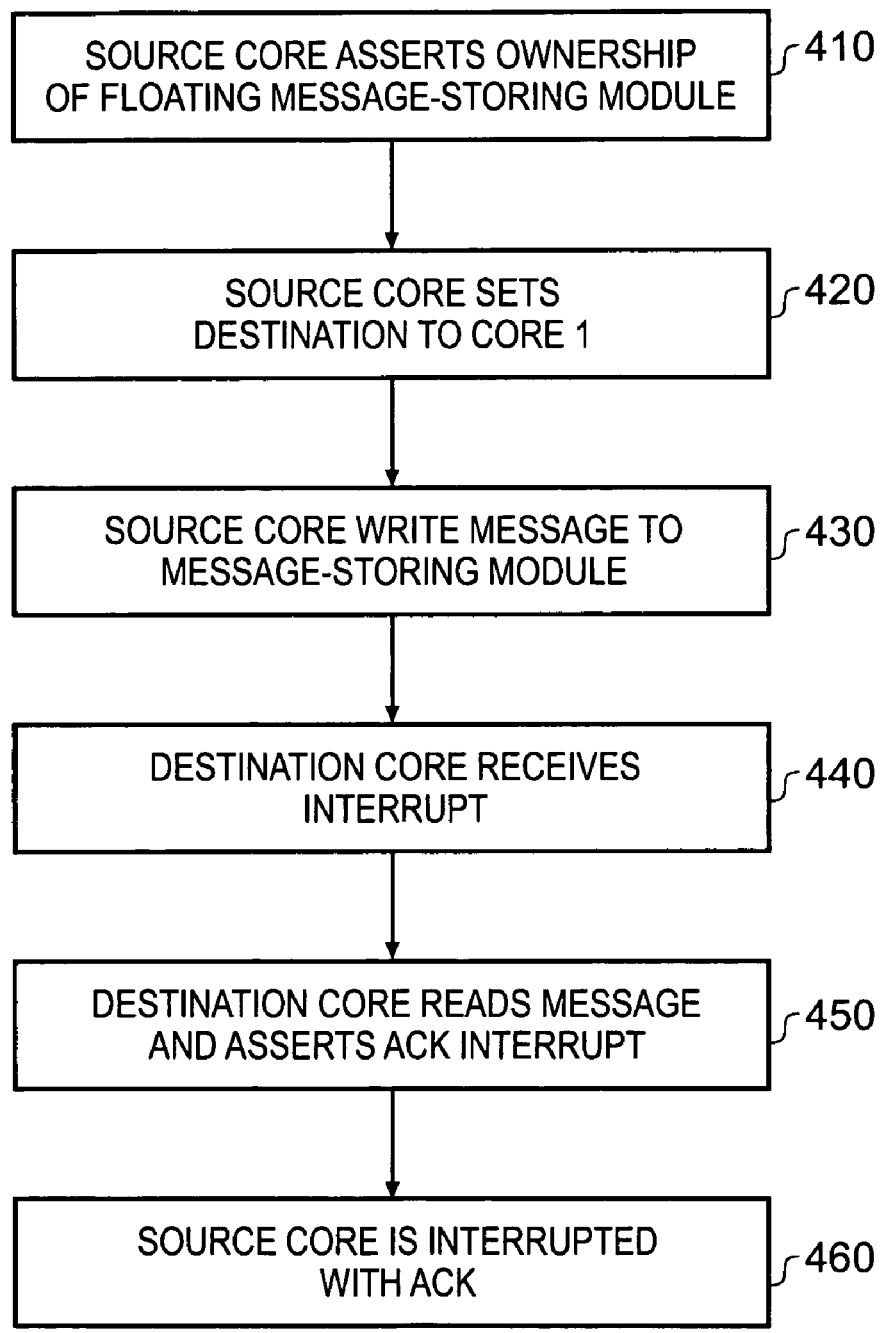
FIG. 4 is a flow chart that schematically illustrates the basic operation of the message handler and the control registers of the message-handling modules.

FIG. 4 is a flow chart that schematically illustrates the basic operation of the message handler 130 and the control registers of the message-handling modules 132-1 to 132-n. At stage 410 the source core, Core 0, generates a message and claims ownership of a floating message-storing repository by setting the zeroth bit in the source register 310. At stage 420 the source core then sets the first bit in the destination register, which defines Core 1 as the destination core and also enables the interrupts. At stage 430 the source core programs the message into the data registers 350. The source core sends the message to the destination core by writing 01 to the send register 340. This asserts an interrupt to Core 1 to notify the destination core that a relevant message has been written into the repository.

Next, at stage 440, the destination Core 1 is receives the interrupt whereupon it reads the masked interrupt status register to determine which message-handling module contains the message. At stage 450 the destination core reads the message from the identified message-handling module, then clears the interrupt and asserts an acknowledge interrupt by writing 10 to the send register, triggering the sending of a message to the source core. Finally, at stage 460, the source core is interrupted with the acknowledge message, completing the message-passing operation. At the final stage 460, after the message exchange is complete, the source core can either retain ownership (i.e. write-control) of the message-storing to enable sending of another message or, alternatively, it can release the message-storing repository, freeing it up for use by other cores in the system.

Figure 5:
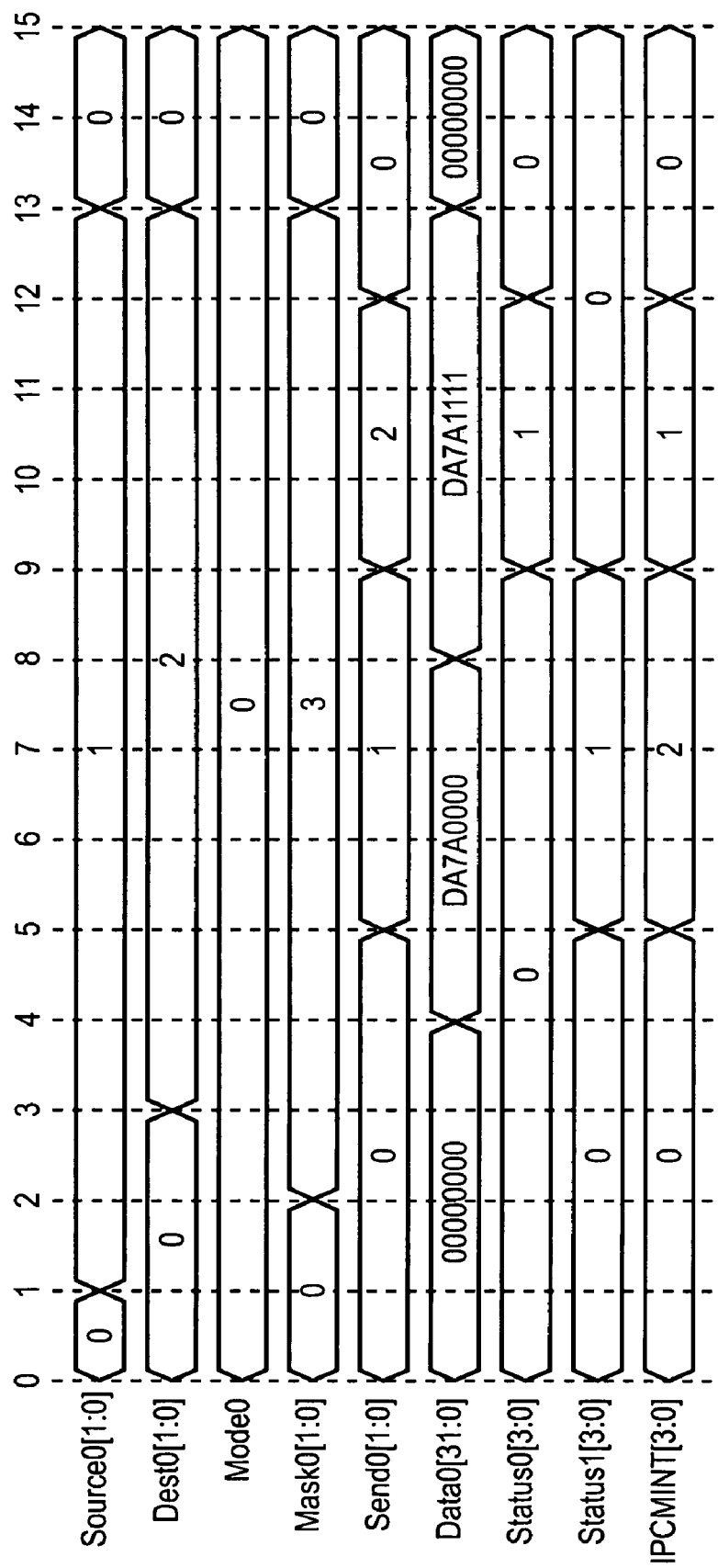
FIG. 5 schematically illustrates a messaging sequence between a source core and a destination core.

FIG. 5 schematically illustrates a messaging sequence between two processor cores core0, which is the source core, and core1, which is the destination core. There are four message-handling modules in the data processing apparatus to which this messaging sequence relates. Source Core 0 uses channel ID 1 whereas destination Core 1 uses channel ID 2. The following sequence of events occurs:

In the messaging sequence of FIG. 4, the following time sequence of events occurs:

At stage 1, Core 0 gains control of message-handling module 0 and identifies itself as the source core by setting bit 0 in the Source0 Register. At stage 2, Core 0 enables interrupts to Core 0 and Core1 by setting bits 0 and 1 in the mask register 330. At stage 3 Core 0 defines the destination core by setting bit 1 in the destination register 320. At stage 4, Core 0 programs the data payload, DA7A0000. At stage 5, Core 0 sets Send0 bit 0 to trigger the message-handling module 0 interrupt to Core 1. At stage 6, Core 1 reads the Status 1 location to determine which message-handling module caused the interrupt. In this case, only message-handling module 0 is indicated. At stage 7, Core 1 reads the data payload. At stage 8, Core 1 optionally updates the data payload with the acknowledge data, DA7A1111. At stage 9, Core 1 clears bit 0 and sets bit 1 in the send register 340 to clear its interrupt and provide a manual acknowledge interrupt back to Core 0. At stage 10, Core 0 reads Status0 to determine which message-handling module caused the interrupt. Again, only message-handling module 0 is indicated. At stage 11, Core 0 reads the acknowledge payload data. At stage 12, Core 0 clears bit 1 in the Send Register to clear its interrupt. At stage 13, Core 0 releases ownership of the message-handling module by clearing Source0, which in turn clears register locations Dest0, Mask0, and Data0. Note that Core 0 can hold on to the message-handling module to send another data message by not clearing the Source0 Register at stage 13.

Figure 6:
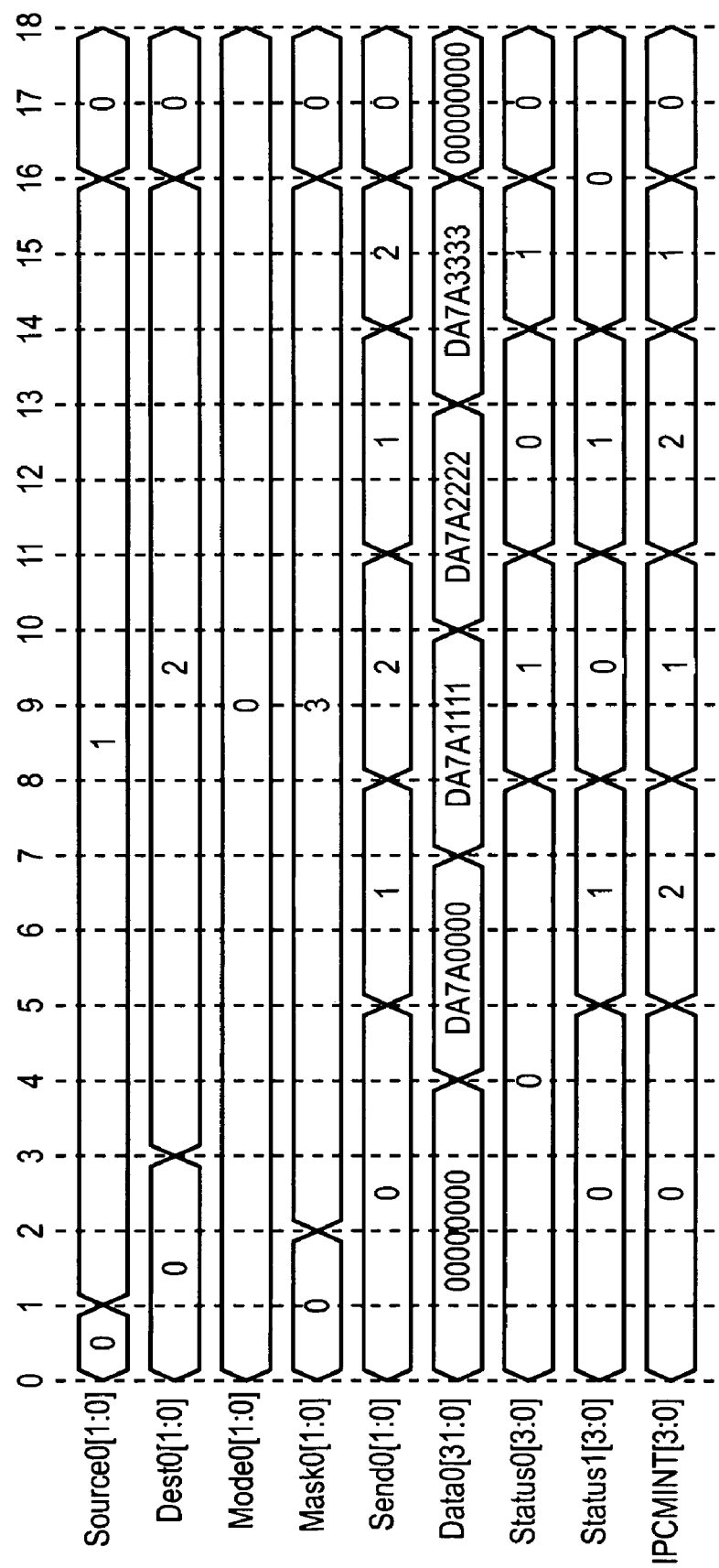
FIG. 6 schematically illustrates a messaging timing sequence in which two consecutive messages are sent from the source core to the destination core.

FIG. 6 schematically illustrates a messaging timing sequence in which two consecutive messages are sent from Core 0 to Core 1. As in the message sequence of FIG. 3, there are two cores and four message-handling modules. Core 0 is the source core and Core 1 is the destination core. Core 0 uses Channel ID 1 and Core I uses Channel ID 2. Core 0 sends a message to Core 1, obtains an acknowledge, and sends another message to Core 1, which is also acknowledged.

In the messaging timing sequence of FIG. 6, the following sequence of events occurs.

At stage 1, Core 0 gains control of message-handling module 0 and identifies itself as the Source core by setting bit 0 in the Source0 Register. At stage 2, Core 0 enables interrupts to Core 0 and Core1 by setting bits 0 and 1 in the mask register 330. At stage 3, Core 0 defines the destination core by setting bit 1 in the destination register 320. At stage 4, Core 0 programs the data payload, DA7A0000. At stage 5, Core 0 sets bit 0 of the send register 340 to send the interrupt to the destination core. At stage 6, Core 1 reads status1 and reads the data payload. At stage 7, Core 1 optionally updates the data payload for the acknowledge, DA7A1111. At stage 8, Core 1 clears bit 0 and sets bit 1 in the send register 340 to provide a manual acknowledge back to Core 0. At stage 9, Core 0 reads Status0 and reads the data payload. At stage 10, Core 0 programs the data payload for the next message, DA7A2222. At stage 11, Core 0 clears bit 1 and sets bit 0 of the Send Register to send the interrupt to the destination core. At stage 12, Core 1 reads Status1 and reads the data payload. At stage 13, Core 1 optionally updates the data payload for the acknowledge, DA7A3333. At stage 14, Core 1 clears bit 0 and sets bit 1 in the send register 340 to provide the manual acknowledge back to Core 0. At stage 15, Core 0 reads Status0 and reads the data payload. Finally, at stage 16, Core 0 clears the interrupt and releases ownership of the message-handling module by clearing Source0, which in turn clears registers Dest0, Mask0, Send0, and Data0.

Figure 7:
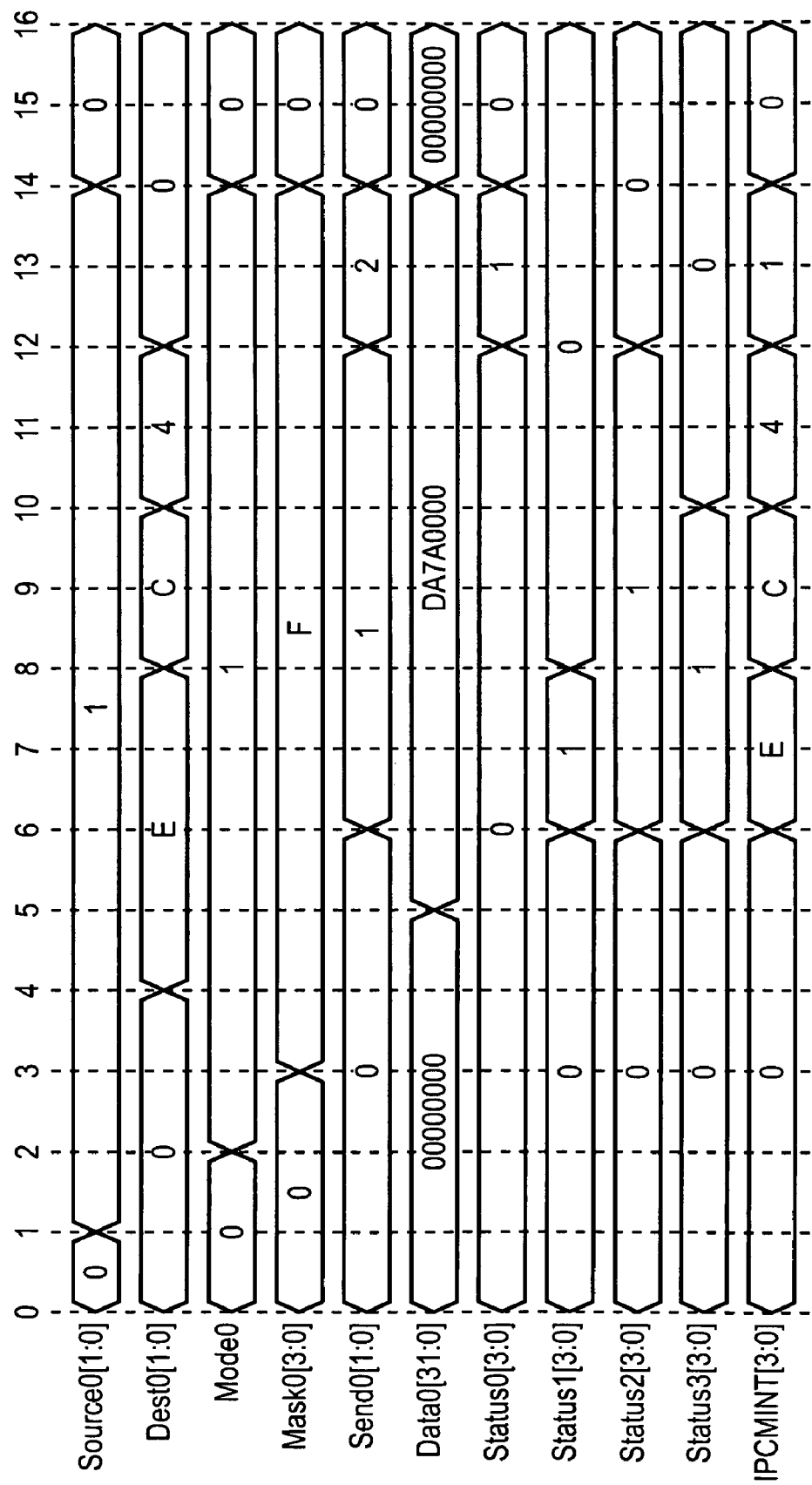
FIG. 7 schematically illustrates a messaging timing sequence for a message communication from a source core to three destination cores, in which an automatic acknowledgement is generated when all of the destination cores have received the message.

FIG. 7 schematically illustrates a messaging timing sequence for a message communication from a source core to three destination cores, in which an automatic acknowledgement is generated when all of the destination cores have received the message.

In this example system, Core 0 is the source processor core and Cores 1, 2, and 3 are the destination processor cores. Each of the four cores has an associated message-handling module.
Core 0 uses Channel ID 1
Core 1 uses Channel ID 2
Core 2 uses Channel ID 4
Core 3 uses Channel ID 8.

The auto-link mode is disabled for this message communication.

The following timed sequence of communications occurs:

At stage 1, core 0 gains control of message-handling module 0 and identifies itself as the source processor core by setting bit 0 in the source0 register. At stage 2, core 0 sets mode bit 0 to put the message-handling module into auto acknowledge mode. At stage 3, core 0 enables interrupts to core 0, core 1, core 2, and core3 by setting bits 0, 1, 2, and 3 in the mask register. At stage 4, core 0 defines the destination cores by setting bits 1, 2, and 3 in the destination register. At stage 5, core 0 programs the data payload, DA7A0000.

Next, at stage 6, core 0 sets bit 0 of its send register to send the interrupts to the destination cores. At stage 7, core 1 reads status1 and reads the data payload. At stage 8, core 1 clears bit 1 in the destination register. At stage 9, core 3 reads status3 and reads the data payload. At stage 10, core 3 clears bit 3 in the destination Register. At stage 11, core 2 reads status2 and reads the data payload. At stage 12, core 2, which is the last of the three cores to receive the message, clears bit 2 in the destination register. Thus core 2 having cleared the final destination bit, the message-handling module associated with core 0 automatically detects this, clears send bit 0 and sets send bit 1 to provide the auto acknowledge back to the source processor core, core 0. Note that the data registers are not updated in auto acknowledge mode.

At stage 13, the source processor core, core 0 reads status0 and reads the data payload. In this example, at the final stage of the sequence, stage 14, core 0 clears the interrupt and releases ownership of the message-handling module by clearing the source0 register, which in turn clears registers send0 and data0. However, in an alternative messaging sequence, if core 0 had a further message to send, it could maintain ownership of the message-handling module by keeping the source register set, and updating the destination, mode, mask0 registers, and loading the data registers with the new message at step 14.

Figure 8:
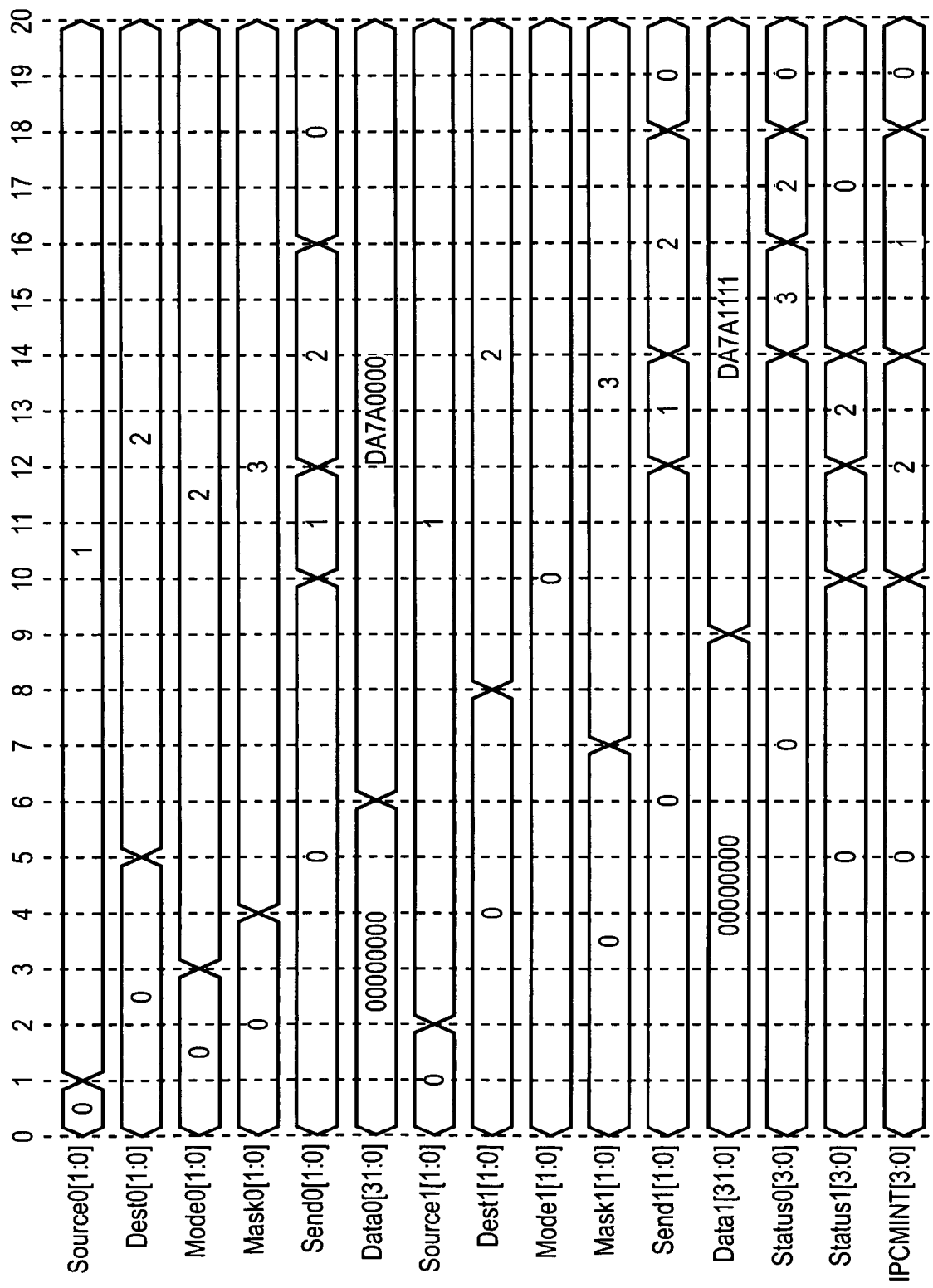
FIG. 8 schematically illustrates a messaging timing sequence for a sending a linked sequence of messages from a source core to a single destination cores.

FIG. 8 schematically illustrates a messaging timing sequence for a sending a linked sequence of messages from a source core to a single destination core. Although there are four message-handling modules in this example system only modules 0 and 1 are active whereas message-handling modules 3 and 4 are inactive. In this particular example the auto-link messaging mode is enabled but the auto-acknowledge mode is disabled for the purpose of clarifying explanation of the auto-link feature so the destination core that receives the last message in the sequence may optionally send an acknowledgement interrupt to the source processor core. The acknowledgement is manual in the sense that the destination core must actively set bit 1 of the send register of the message-handling module associated with the source core after clearing its interrupt (clearing bit 0 of the send register) in order to initiate sending of the interrupt back to the source core from its associated message-handling module. By way of contrast, with auto-acknowledge mode enabled, the message handler (rather than the destination core) automatically sets bit 1 of the send register when it detects via the destination register that the final destination bit had been cleared.

In this example system, core 0 is the source processor core and core 1 is the destination processor core. Core 0 uses channel ID 1 and core 1 uses channel ID 2. Core 0 first sets up mailboxes 0 and 1 in auto link mode which includes storing a message in each of the two message-handling modules, core 0 then sends the first message followed by the second message to Core 1. Core 1 responds to each message notification interrupt separately and acknowledges both. Core 0 only obtains an acknowledge interrupt when Core 1 has finished with the final message.

Referring to the timing sequence of FIG. 8, the following sequence occurs:

At stage 1, core 0 gains control of message-handling module 0 and sets source0[0].

At stage 2, core 0 gains control of Message-handling module 1 and sets source1[0].

At stage 3, core 0 links message-handling module 0 to message-handling module 1 by setting mode0[1]. The mode register of message-handling module is not set to auto-link mode since this is the last message-handling module of the linked subset so an acknowledge interrupt should be generated when this last message-handling module has received a message. At stage 4, core 0 enables interrupts to core 0 and core1 by setting bits 0 and 1 in the mask0 register.

At stage 5, core 0 defines the destination core of message-handling module 0 by setting dest0[1]. At stage 6, core 0 programs the data payload of message-handling module 0 by setting data0 to DA7A0000. At stage 7, Core 0 enables interrupts to both Core 0 and Core1 by setting bits 0 and 1 in the mask1 register. At stage 8, core 0 defines the destination core of message-handling module 1 by setting dest1[1]. At stage 9, core 0 programs the data payload of message-handling module 1 by setting data1 to DA7A1111.

At stage 10, core 0 sets send0[0] to initiate sending of the message in message-handling module 0 to the destination core, core 1. At stage 11, core 1, in response to a message notification interrupt, reads status1 and reads the data payload in message-handling module 0. At stage 12, core 1 clears bit 0 and sets bit 1 in the send0 register to provide a manual acknowledge back to Core 0. The effect of the manual acknowledge for this first message in the sequence is to initiate sending of the message in message-handling module 1. Note that there is no acknowledge interrupt sent to core0 at this stage.

Next, at stage 13, in response to the clearing of bit 0 and the setting of bit 1 in the send register, core 1 reads status1 and reads the data payload in message-handling module 1. At stage 14, core 1 clears bit 0 and sets bit 1 in the send1 Register to provide the manual acknowledge back to core 0. Since this is the last of the two messages in the sequence, clearing of bit 0 and setting of bit 1 in the send register triggers the transmission of an acknowledge interrupt to the source processor core, core 0. At stage 15, core 0 reads status0. At stage 16, core 0 clears bit 1 of send0 register to clear the interrupt from message-handling module 0. At stage 17, core 0 reads status1. Finally, at stage 18, core 0 clears bit 1 send1 register to clear the acknowledge interrupt from message-handling module 1.

Figure 9:
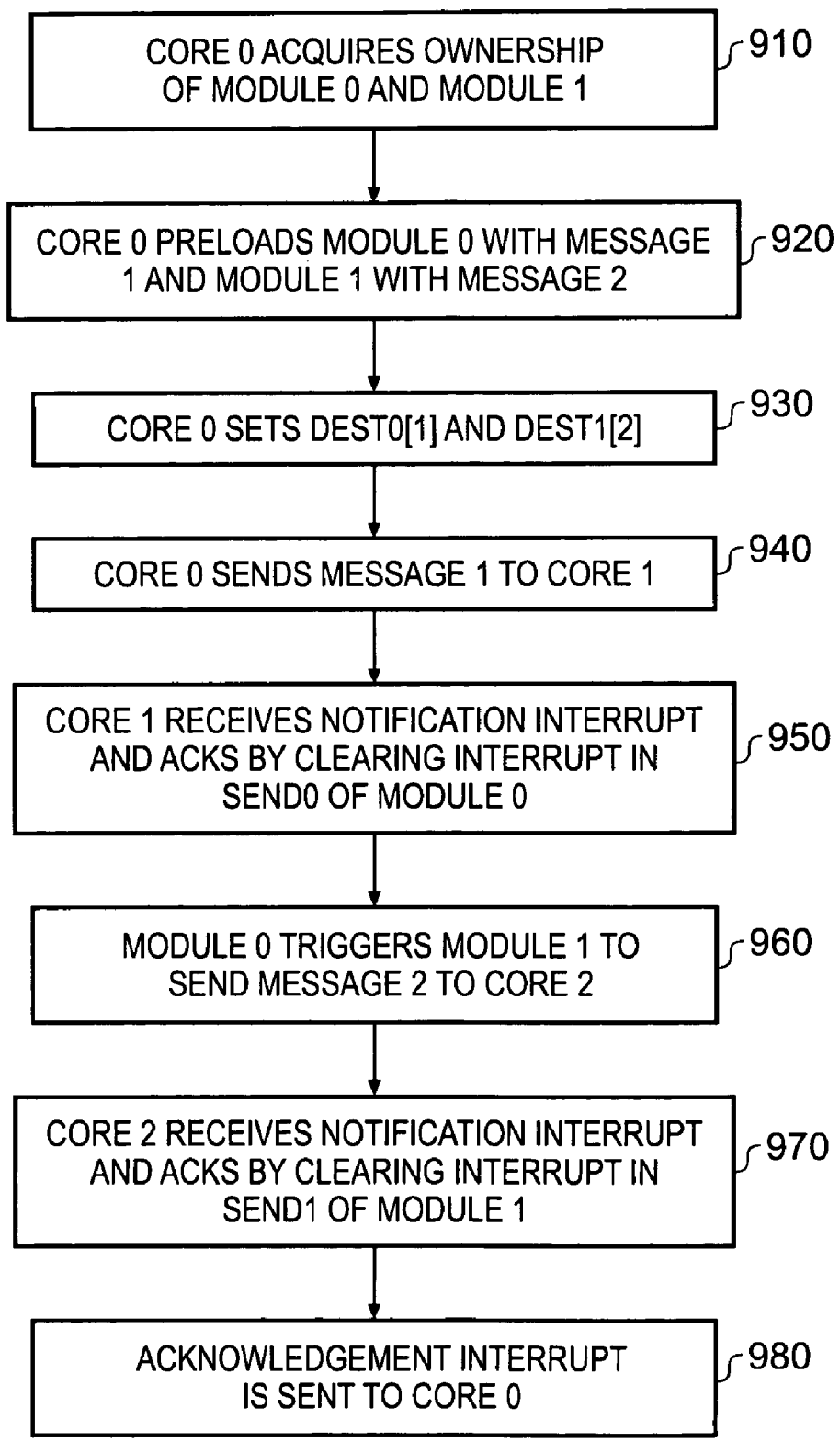
FIG. 9 is a flow chart that schematically illustrates automatic linking of a subset of message-handling modules.

FIG. 9 is a flow chart that schematically illustrates automatic linking of a subset of message-handling modules. The example data processing system to which the flow chart relates has a source processor core, core 0, and two destination processor cores, core 1 and core 2. Core 0 has two different messages to send: message 1, which is intended for core 1 and message 2 which is intended for core 2. There is a constraint in this system that core 2 cannot start processing message 2 until core 1 has processed message 1. This constraint is implemented by the auto-linking of a subset comprising two message-handling modules, both of which are associated with the source processor core.

At stage 910, core 0 acquires ownership of message-handling module 0 and message-handling module 1 by setting bit 0 in the source registers of each of the two modules. At stage 920, core 0 pre-loads module 0 with the first message and pre-loads module 1 with the second message. Next, at stage 930, core 0 appropriately sets the destination registers of module 0 and module 1 to specify core 1 and core 2 respectively. At stage 940, core 0 initiates the sending of the first message to core 1 by setting bit 0 of the send register of message-handling module 0. At stage 950, core 1 receives a message-notification interrupt, reads the masked interrupt status register related to that interrupt line to identify module 0 as the module that triggered the interrupt and then clears the interrupt by clearing bit 0 of the send register of module 0. Next, at stage 960, message-handling module 0 triggers module 1 to initiate sending of message 2 to core 2. Triggering of the next message is effected by the clearing of bit 0 and the setting of bit 1 in the send register of module 0. Accordingly, the setting of bit 1 of the send register results in the setting of send bit 0 in the next module in the linked subset, module 1, so that the next message in the sequence is sent, rather than causing an acknowledgement interrupt to be sent back (to the source core. At stage 970, core 2 receives a message-notification interrupt, reads the masked interrupt status register related to that interrupt line to identify module 1 as the module that triggered the interrupt and then clears the interrupt by clearing bit 0 of the send register of module 1. Since module 1 is the last module in the linked subset of message-handling modules, bit 1 of the mode register is not set so auto-link is not enabled for this module. Accordingly, when core 2 clears bit 0 and sets bit 1 of message-handling module 1, an acknowledge interrupt is sent back to the source core, core 0 and communication of the message sequence is complete.

Although illustrative embodiments have been described in detail herein with reference to the accompanying drawings, it is to be understood that the invention is not limited to those embodiments, and that various changes and modifications can be effected therein by one skilled in the art without departing from the scope and spirit of the appended claims.

We claim:

1. A data processing apparatus comprising:
   at least one destination processor core;
   at least one source processor core operable to generate a message to at least two specified destination cores;
   a message handler having a plurality of message-handling modules; and
   a bus arrangement providing a data communication path between said source processor core, said destination processor core and said message handler;
   wherein at least one message-handling module associated with a respective specified source processor core has:
   a message receipt indicator being modifiable by each of said at least two specified destination processor cores to indicate through an indicator value that said message has been received at the corresponding specified destination processor core;
   a transmission completion detector operable to detect, in dependence upon said indicator value, that said message has been received by all of said at least two specified destination cores; and
   message acknowledgement generation logic responsive to said transmission completion detector detecting that said message has been received by all of said at least two specified destination cores, to initiate transmission of an acknowledgement signal to said source processor core.

2. A data processing apparatus as claimed in claim 1, wherein said at least one message-handling module has memory allocated for storage of a message generated by said specified source processor core, said message being readable through said bus arrangement by one or more destination processor cores.

3. A data processing apparatus as claimed in claim 1, wherein said at least one message-handling module has an associated memory region for storage of a message generated by said specified source processor core, said associated memory region being a region in a memory that is shared between said at least one source processor core and said at least one destination processor core.

4. A data apparatus as claimed in claim 1, wherein one of said at least two specified destination cores is said source processor core.

5. A data processing apparatus as claimed in claim 1, wherein said message handler comprises interrupt generating circuitry operable to notify said destination processor core of the presence of said message by transmitting an interrupt to said destination processor core.

6. A data processing apparatus as claimed in claim 5, wherein at least one of said at least two specified destination processor cores comprises an interrupt controller operable to process interrupts transmitted to said destination processor core by said message handler.

7. A data processing apparatus as claimed in claim 5, wherein said at least one message-handling module has a mask status register having a programmable value for enabling or disabling transmission of interrupts to said destination processor core.

8. A data processing apparatus as claimed in claim 7, wherein said mask status register has an associated mask set register used to set bits in said mask status register and an associated mask clear register used to clear bits in said mask status register.

9. A data processing apparatus as claimed in claim 7, wherein said mask status register has an associated masked interrupt status register operable to store a value indicating which message-handling module triggered a currently asserted interrupt.

10. A data processing apparatus as claimed in claim 1, wherein said at least one programmable message-handling module has a source register operable to store a programmable value corresponding to said specified source processor core.

11. A data processing apparatus as claimed in claim 10, wherein said source register is operable to define an interrupt line to be asserted to said specified source processor core for transmission of an acknowledge interrupt.

12. A data processing apparatus as claimed in claim 10, wherein said source register has a cleared mode specified by a cleared value in which a source processor core has write-access to said source register and a programmed mode in which said source register stores a value corresponding to a source processor core and in which said source register may be reset into said cleared mode but is otherwise write-disabled.

13. A data processing apparatus as claimed in claim 1, wherein said at least one programmable message-handling module has a destination register operable to store a programmable value indicating said at least two specified destination processor cores.

14. A data processing apparatus as claimed in claim 13, wherein said destination register has a destination set register used to set bits in said destination register and a destination clear register used to clear bits in said destination register.

15. A data processing apparatus as claimed in claim 13, wherein said message receipt indicator is said message destination register.

16. A data apparatus as claimed in claim 1, wherein one of said at least one source processor cores is operable to send a sequence of messages to a linked subset of said plurality of message-handling modules, each message having a respective specified destination processor core and each message-handling module in said linked subset of message-handling modules having a message receipt indicator, a transmission completion detector and message acknowledgement generation logic and wherein transmission of second and subsequent messages in said message sequence of said linked subset of message-handling modules is initiated when said message receipt indicator of the message-handling module corresponding to a preceding message in said message sequence indicates that said preceding message has been received at the respective specified destination core.

17. A data processing apparatus as claimed in claim 1, wherein said at least one message-handling module has a send register operable to store at least one interrupt status bit that determined whether an interrupt to one of said at least two specified destination processor cores or to said specified source processor core is currently triggered.

18. A data processing apparatus as claimed in claim 17, wherein at least one of said at least two said specified destination processor cores is operable to indicate receipt of said message by initiating modification of said send register value to clear said interrupt to said destination processor core.

19. A data processing apparatus as claimed in claim 18, wherein said modification of said send register value initiates transmission of an acknowledge interrupt to said source processor core.

20. A data processing apparatus as claimed in claim 17, wherein said message receipt indicator is said send register.

21. A data processing apparatus as claimed in claim 16, wherein said at least one message-handling module has a mode register operable to store a value indicating if the associated message-handling module is linked to a consecutive message-handling module in said linked subset of message-handling modules.

22. A data processing apparatus as claimed in claim 21, wherein said transmission completion detector detects a last message-handling module in said linked subset using said mode register value and initiates generation of an acknowledgement interrupt to said source core when the destination core for the message in said last message-handling module indicates receipt of said message.

23. A data processing apparatus as claimed in claim 22, wherein all message-handling modules in said linked subset except the last message-handling module are configurable such that generation of an acknowledge interrupt to said source processor core is disabled.

24. A data processing apparatus as claimed in claim 23, wherein said message-handling module associated with said last processor core is operable to automatically set a send register to initiate generation of an acknowledgement interrupt to said source processor core when the send register of said last message-handling module indicates that an interrupt should be sent to said source processor core.

25. A data processing apparatus as claimed in claim 1, wherein said message handler is configurable to specify configuration parameters comprising at least one of:
 a number of message-handling modules;
 a memory capacity for storage of said message in each message-storing module; and
 a number of interrupt signal paths available to said message handler.

26. A data processing apparatus as claimed in claim 23, wherein said message handler comprises a configuration register operable to store configuration parameters.

27. A method for communicating data between at least one source processor core and at least one destination processor core using a message handler having a plurality of message-handling modules and having a bus arrangement that provides a data communication path between said source core, said at least one destination core and said message handler, said method comprising the steps of:
 transmitting a message from a specified source processor core to message-handling modules associated with respective ones of at least two specified destination processor cores;
 modifying an indicator value of a message receipt indicator belonging to a message-handling module associated with either said source processor core or one of said specified destination processor cores to indicate that said message has been received at the corresponding specified destination processor core;
 detecting using a transmission completion detector and in dependence upon said indicator value, that said message has been received by all of said at least two specified destination cores; and
 initiating transmission of an acknowledgement signal to said source processor core in response to said transmission completion detector detecting that said message has been received by all of said at least two specified destination cores.

28. A method as claimed in claim 27, comprising the step of storing said message in memory located in said at least one message-handling module such that said message is readable through said bus arrangement by one or more destination processor cores.

29. A method as claimed in claim 27, comprising the step of storing said message in memory associated with said at least one message handling module, said associated memory being memory that is shared between said at least one source processor core and said at least one destination processor core.

30. A method as claimed in claim 27, wherein one of said at least two specified destination cores is said source processor core.

31. A method as claimed in claim 27, wherein said message handler comprises interrupt generating circuitry operable to notify said destination processor core of a presence of said message by transmitting an interrupt to said destination processor core.

32. A method as claimed in claim 31, wherein at least one of said at least two specified destination processor cores comprises an interrupt controller operable to process interrupts transmitted to said destination processor core by said message handler.

33. A method as claimed in claim 27, wherein said at least one message-handling module has a mask status register having a programmable value for enabling or disabling transmission of interrupts to said destination processor core.

34. A method as claimed in claim 33, wherein said mask status register has an associated mask set register used to set bits in said mask status register and an associated mask clear register used to clear bits in said mask status register.

35. A method as claimed in claim 33, wherein said mask status register has an associated masked interrupt status register operable to store a value indicating which message-handling module triggered a currently asserted interrupt.

36. A method as claimed in claim 27, wherein said at least one programmable message-handling module has a source register operable to store a programmable value corresponding to said specified source processor core.

37. A method as claimed in claim 36, wherein said source register is operable to define an interrupt line to be asserted to said specified source processor core for transmission of an acknowledge interrupt.

38. A method as claimed in claim 36, wherein said source register has a cleared mode specified by a cleared value in which a source processor core has write-access to said source register and a programmed mode in which said source register stores a value corresponding to a source processor core and in which said source register may be reset into said cleared mode but is otherwise write-disabled.

39. A method as claimed in claim 27, wherein said at least one programmable message-handling module has a destination register operable to store a programmable value indicating said at least two specified destination processor cores.

40. A method as claimed in claim 39, wherein said destination register has a destination set register used to set bits in said destination register and a destination clear register used to clear bits in said destination register.

41. A method as claimed in claim 39, wherein said message receipt indicator is said message destination register.

42. A method claimed in claim 27, wherein one of said at least one source processor cores is operable to send a sequence of messages to a linked subset of said plurality of message-handling modules, each message having a respective specified destination processor core and each message-handling module in said linked subset of message-handling modules having a message receipt indicator, a transmission completion detector and message acknowledgement generation logic and wherein transmission of second and subsequent messages in said message sequence of said linked subset of message-handling modules is initiated when said message receipt indicator of the message-handling module corresponding to a preceding message in said message sequence indicates that said preceding message has been received at the respective specified destination core.

43. A method as claimed in claim 27, wherein said at least one message-handling module has a send register operable to store at least one interrupt status bit that determined whether an interrupt to one of said at least two specified destination processor cores or to said specified source processor core is currently triggered.

44. A method as claimed in claim 43, wherein at least one of said at least two said specified destination processor cores is operable to indicate receipt of said message by initiating modification of said send register value to clear said interrupt to said destination processor core.

45. A method as claimed in claim 44, wherein said modification of said send register value initiates transmission of an acknowledge interrupt to said source processor core.

46. A method as claimed in claim 43, wherein said message receipt indicator is said send register.

47. A method as claimed in claim 42, wherein said at least one message-handling module has a mode register operable to store a value indicating if the associated message-handling module is linked to a consecutive message-handling module in said linked subset of message-handling modules.

48. A method as claimed in claim 47, wherein said transmission completion detector detects a last message-handling module in said linked subset using said mode register value and initiates generation of an acknowledgement interrupt to said source core when the destination core for the message in said last message-handling module indicates receipt of said message.

49. A method as claimed in claim 48, wherein all message-handling modules in said linked subset except the last message-handling module are configurable such that generation of an acknowledge interrupt to said source processor core is disabled.

50. A method as claimed in claim 49, wherein said message-handling module associated with said last processor core is operable to automatically set a send register to initiate generation of an acknowledgement interrupt to said source processor core when the send register of said last message-handling module indicates that an interrupt should be sent to said source processor core.

51. A method as claimed in claim 27, wherein said message handler is configurable to specify configuration parameters comprising at least one of:
 a number of message-handling modules;
 a memory capacity for storage of said message in each message-storing module; and
 a number of interrupt signal paths available to said message handler.

52. A method as claimed in claim 51, wherein said message handler comprises a configuration register operable to store said configuration parameters.

53. A computer-readable storage medium storing a computer program for controlling a source processor core within a data processing apparatus operable to communicate data between at least one source processor core and at least one destination processor core using a message handler, each of a plurality of message-handling modules having memory allocated for storage of a message generated by a source processor core and having a bus arrangement that provides a data communication path between said source processor core, said at least one destination core and said message handler, computer program for controlling said source processor core comprising:
 configuration code operable to assert exclusive control by said source processor core of at least two of said message-handling modules for respective storage of at least two messages;
 destination core defining code operable to specify in each of said at least two message-handling modules, a respective destination core for an associated message; mode setting code operable to set an automatic acknowledge mode in at least one of said at least two message-handling modules such that message acknowledgement signals to said source processor core are suppressed until all of said at least two messages have been received at their respective destinations.

54. A computer-readable storage medium storing a computer program for controlling a destination processor core within a data processing apparatus operable to communicate data between at least one source processor core and at least one destination processor core using a message handler, each of a plurality of message-handling modules having memory allocated for storage of a message generated by a source processor core and having a bus arrangement that provides a data communication path between said source processor core, said at least one destination core and said message handler, said computer program for controlling said destination processor core comprising:
 message source identifying code operable to access said message handler to establish which of said message-handling modules generated a message notification signal; and
 message-notification signal clearing code operable to modify a stored message receipt indicator value in said identified message-handling module and to clear said message-notification signal;
 wherein said message-notification signal clearing code enables a message-handling module to use a transmission completion detector to detect in dependence upon said indicator value that said message has been received by all of said at least two destination processor cores and to initiate transmission of an acknowledgement signal to said source processor core.

* * * * *